United States Patent
Rozenberg et al.

(10) Patent No.: US 12,411,825 B2
(45) Date of Patent: Sep. 9, 2025

(54) EXPANDING DATABASE COLUMN NAMES

(71) Applicant: INTERNATIONAL BUSINESS MACHINES CORPORATION, Armonk, NY (US)

(72) Inventors: Boris Rozenberg, Ramat Gan (IL); Yehoshua Sagron, Haifa (IL); Ariel Farkash, Shimshit (IL); Igor Gokhman, Haifa (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/537,879

(22) Filed: Dec. 13, 2023

(65) Prior Publication Data
US 2025/0200017 A1 Jun. 19, 2025

(51) Int. Cl.
G06F 16/00 (2019.01)
G06F 16/22 (2019.01)

(52) U.S. Cl.
CPC .................. G06F 16/221 (2019.01)

(58) Field of Classification Search
CPC .................................................. G06F 16/221
See application file for complete search history.

(56) References Cited

U.S. PATENT DOCUMENTS

| | | | |
|---|---|---|---|
| 7,809,715 B2 | 10/2010 | Wei | |
| 9,020,805 B2* | 4/2015 | Boguraev | G06F 40/274 704/9 |
| 9,031,832 B2 | 5/2015 | Boguraev | |
| 9,390,081 B2 | 7/2016 | Anders | |
| 10,650,808 B1* | 5/2020 | Platt | G16H 10/60 |
| 10,929,455 B2 | 2/2021 | Jetley | |
| 11,068,653 B2 | 7/2021 | Gahlot | |
| 11,152,084 B2 | 10/2021 | Kondadadi | |
| 11,461,687 B1* | 10/2022 | Shaikh | G06F 16/212 |
| 2008/0086297 A1* | 4/2008 | Li | G06F 40/40 704/3 |
| 2012/0084076 A1* | 4/2012 | Boguraev | G06F 40/274 704/9 |
| 2016/0140116 A1* | 5/2016 | Li | G06F 16/214 707/609 |
| 2018/0210821 A1* | 7/2018 | Raghavan | G06F 11/3684 |

(Continued)

FOREIGN PATENT DOCUMENTS

CN 114925698 A 8/2022
CN 115293168 A 11/2022

OTHER PUBLICATIONS

Zhang et al. "NameGuess: Column Name Expansion for Tabular Data". Oct. 7, 2023. <https://openreview.net/forum?id=AfEowGM3qG> (Year: 2023).*

(Continued)

*Primary Examiner* — Syed H Hasan
(74) *Attorney, Agent, or Firm* — Kristofer Haggerty

(57) ABSTRACT

A method, a structure, and a computer system for expanding database column names. Exemplary embodiments may include identifying glossary terms that sufficiently syntactically match a column name, extracting partial expansions from the glossary terms, selectively combining a set of the partial expansions, and storing the combined set of partial expansions in association with the column name.

20 Claims, 2 Drawing Sheets

(56) References Cited

U.S. PATENT DOCUMENTS

| | | | |
|---|---|---|---|
| 2020/0409999 A1* | 12/2020 | Chen | G06F 16/367 |
| 2021/0303786 A1 | 9/2021 | Veyseh | |
| 2022/0350810 A1* | 11/2022 | Majumdar | G06N 20/00 |
| 2023/0087421 A1 | 3/2023 | Chikoti | |
| 2023/0169050 A1* | 6/2023 | Chandrahasan | G06N 20/20 |
| | | | 707/803 |
| 2023/0214275 A1* | 7/2023 | Abhyankar | G06F 9/5077 |
| | | | 718/1 |

OTHER PUBLICATIONS

Ifergan et al., "Fuzzy Matching of Obscure Texts With Meaningful Terms Included in a Glossary", U.S. Appl. No. 17/892,169, filed Aug. 22, 2022, 34 pages. (Specs + Drawings).

* cited by examiner

EXPANDING DATABASE COLUMN NAMES

BACKGROUND

The exemplary embodiments relate generally to database management, and more particularly to expanding the names of columns within a database.

There are many tasks that an organization typically performs as part of database management. These tasks may include search, analysis, compliance, etc., and performing these tasks requires interacting with the large amounts of data stored by the database.

SUMMARY

The exemplary embodiments disclose a method, a computer program product, and a computer system for expanding database column name abbreviations. Exemplary embodiments may include identifying glossary terms that sufficiently syntactically match a column name, extracting partial expansions from the glossary terms, selectively combining a set of the partial expansions, and storing the combined set of partial expansions in association with the column name.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Figure 1:
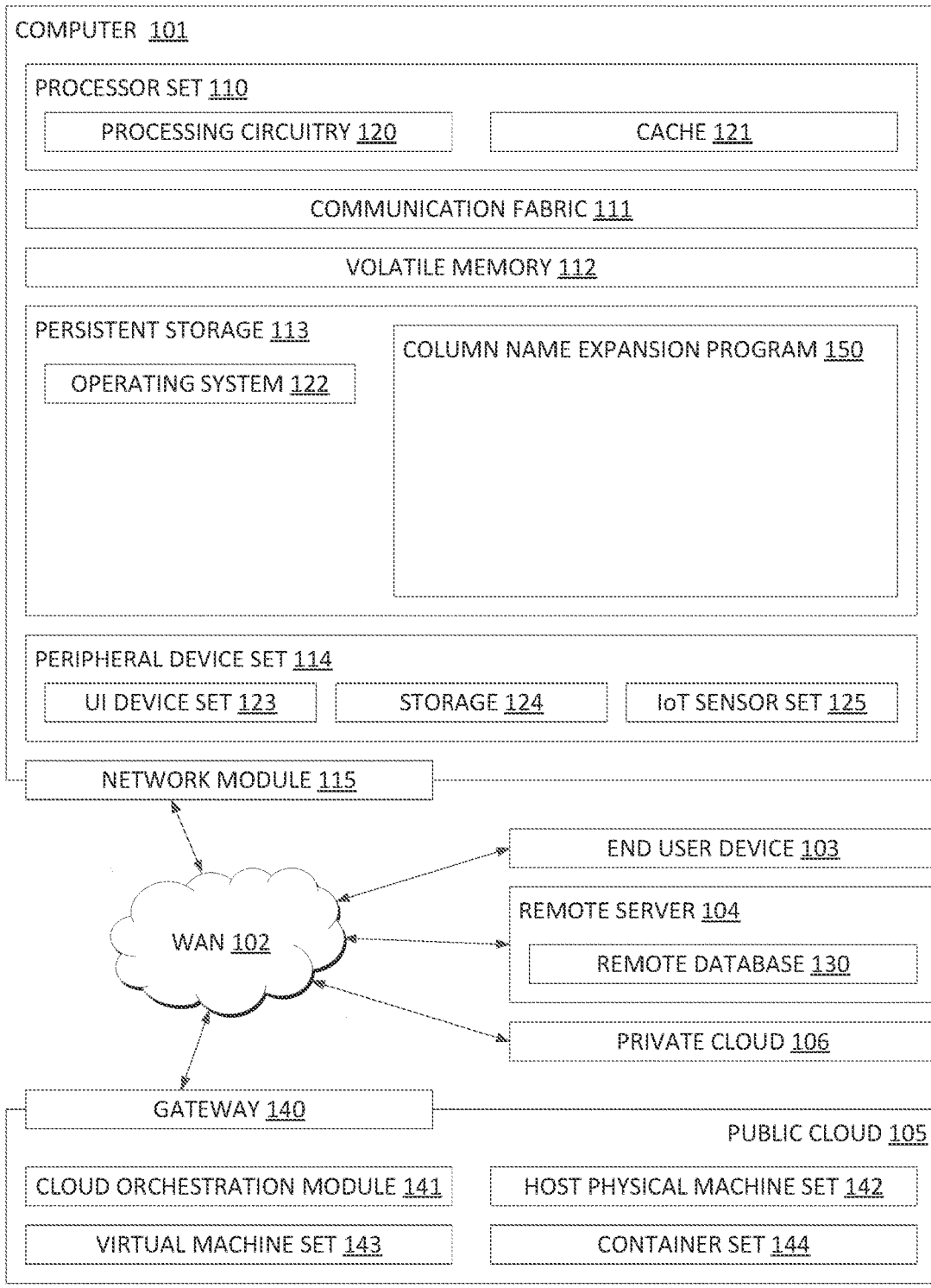
FIG. 1 depicts an exemplary block diagram depicting the components of computing environment 100, in accordance with the exemplary embodiments.

FIG. 1 depicts an exemplary block diagram depicting the components of computing environment 100, in accordance with the exemplary embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as column name expansion program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user, and may take any of the forms discussed above with respect to computer 101. The EUD 103 may further include any components described with respect to computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As previously noted, there are many tasks that an organization typically performs as part of database management. These tasks may include search, analysis, compliance, etc., and performing these tasks requires interacting with the large amounts of data stored by the database. One way to interact with the database is to employ glossaries of terms where column names of the databases are mapped to the various glossary terms. A user may then search databases for data using the terms as well as assign privacy and security related policies to each business term which can then be carried over to the relevant columns.

In the current state of the art, accessing specific data within a database can be problematic. The column names are typically abbreviated and, typically, the only way to analyse information within a database requires identifying someone with knowledge of the database and asking them for the abbreviated column names relevant to your inquiry. For example, a person tasked with determining last quarters profits from a database of information may seek a designer of the database and inquiry which column name abbreviations correspond to data such as income, revenue, sales, dividends, etc. If unable to find someone with knowledge of the specific database, the person may resort to manually identifying columns of relevance and adding them to a lookup table/semantic layer that can sort the database based thereon. This process, however, is labour intensive, tedious, and prone to error. If data is overlooked, for example, the collected data is incomplete or misleading. Worse, failing to properly secure and maintain sensitive data can open oneself up to liability.

There is therefore a need to expand column names correctly such that database management is realized effectively. A known solution is to use manually created abbreviation tables to manually keep track of what column name abbreviations stand for. Another known solution is to apply a large language model (LLM), however while there are LLMs that perform well on expansions to English language, they are not domain specific in that the correct expansion for an abbreviated column name may be different across different domains. Moreover, using an LLM is likely to be less secure and more expensive.

The present invention was conceived to address the flaws of the current state of the art in database management. More specifically, the invention expands column names by implementing a three-phase process: (1) apply approximate string matching to create a list of possible matches for each column; (2) extract all partial expansions from the matches above; and (3) combine best partial expansions to create top-n column name expansions (n is a parameter typically equal to 1-5). By expanding the column names to additional glossary terms, the present invention improves upon the field of database management by improving search, analysis, compliance, etc. with respect to data within a database.

Figure 2:
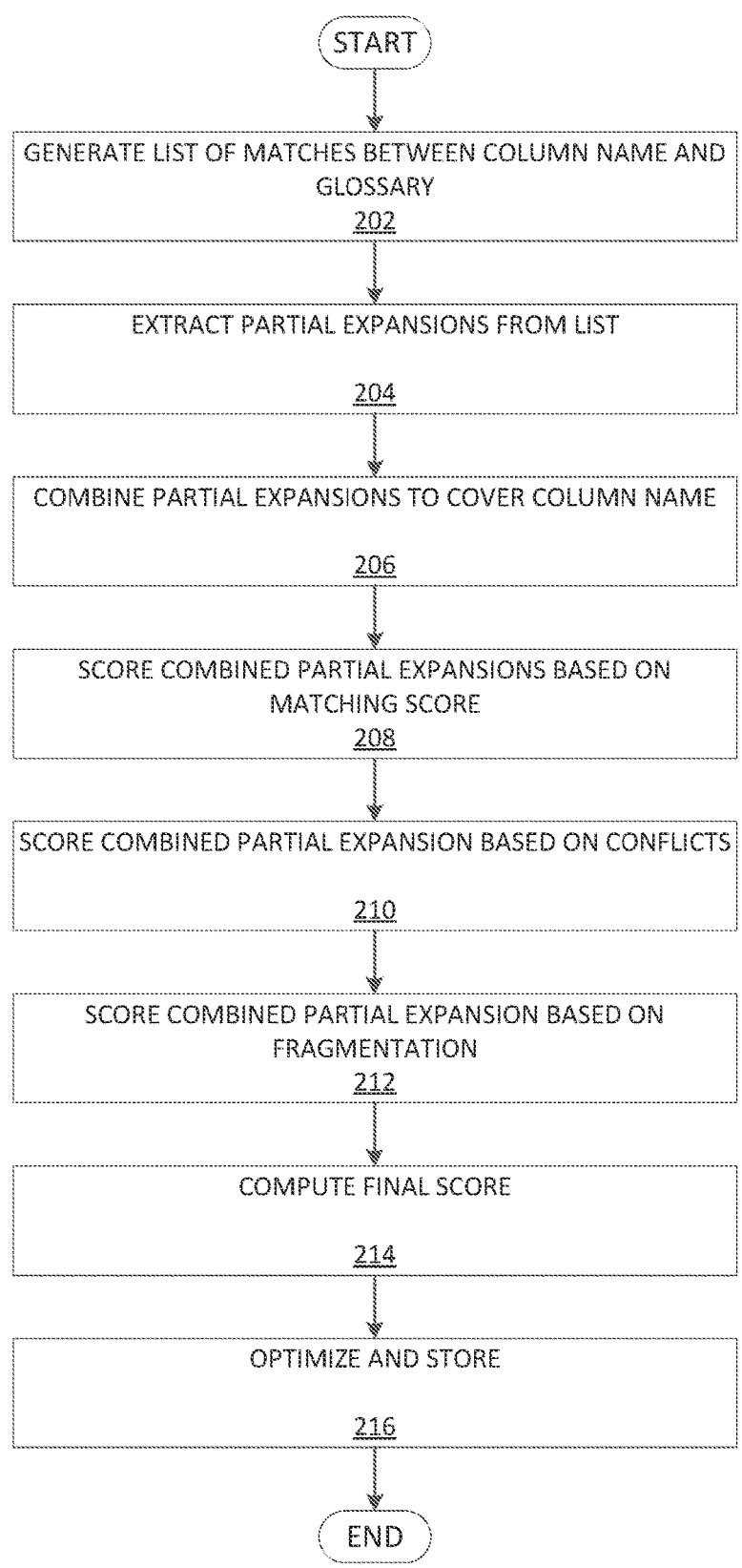
FIG. 2 depicts flowchart 200 illustrating operations of column name expansion program 150 of computing environment 100, in accordance with the exemplary embodiments.

FIG. 2 depicts flowchart 200 illustrating the operations of column name expansion program 150 of computing environment 100, in accordance with the exemplary embodiments.

Column name expansion program 150 may generate a list of matches between an abbreviated column name and terms within a glossary (step 202). In embodiments, column name expansion program 150 may retrieve or receive one or more databases maintained by an organization and one or more glossaries of terms related to the organization. Column name expansion program 150 may generate the list (LM) of k possible matches by comparing a column name (or an abbreviation thereof) within the databases with the terms within the glossaries.

Column name expansion program 150 may perform the comparison using one of several matching techniques, for example using approximate string matching. Approximate string matching is a technique of finding strings that match a pattern approximately rather than exactly. Typical string matching techniques (e.g., fuzzy matching) operate based on a ratio of term tokens shared between strings, known as a term relation score (TRS). Here, and illustrated by Table 1 below, the TRS is illustrated by a fraction comprising the number of tokens within the term as the denominator and the number of matching tokens within the column name as the numerator. Instead of using a TRS, however, column name expansion program 150 may instead determine an input relation score (IRS) that represents a ratio of column name tokens covered by the term tokens. Here, and again illustrated by Table 1 below, the IRS is illustrated by a fraction comprising the number of tokens within the column name as the denominator and the number of matching tokens within the term as the numerator. Using IRS instead of TRS is advantageous in that it allows for the ignoring of term tokens that are not relevant for expansion. Instead, IRS measures the quality of derived partial expansions, as will be discussed below.

TABLE 1

| Fuzzy Matching using IRS | | | |
|---|---|---|---|
| column_name | Term | TRS | IRS |
| usr_act_id | User Account Name | 2/3 | 2/3 |
| | User Account Date | 2/3 | 2/3 |
| | Computer Company | 0/2 | 0/3 |
| | Account Identifier | 2/2 | 2/3 |
| | Action Issued Updated Date | 2/4 | 2/3 |
| | Ideology Origin | 1/2 | 1/3 |

For example, column name expansion program 150 determines a TRS and IRS as illustrated by Table 1 for the column name user account identifier abbreviated as usr_act_id. The term user account name receives a TRS of 2/3 because the column name usr_act_id includes the term tokens user and account but not identifier. Its IRS is also 2/3 because the term user account name covers the column tokens user and account but not identifier. In another example illustrated by Table 1, column name expansion program 150 assigns a TRS of 0/2 to the term computer company because the column name usr_act_id does not include either of the term tokens computer or company. Column name expansion program 150 additionally assigns computer company an IRS of 0/3 because the term computer company doesn't cover the column tokens user, account, or identifier. In another example depicted by Table 1, column name expansion program 150 assigns a TRS of 2/2 to account identifier because the column usr_act_id covers the term tokens account and identifier. Column name expansion program 150 additionally assigns account identifier an IRS of 2/3 because the term includes account and identifier but not user. Column name expansion program 150 may similarly determine a TRS and/or IRS for hundreds or thousands of terms within the organizational glossary of terms.

Column name expansion program 150 may extract unique partial expansions from the list of matches (step 204). As used herein, partial expansions may be one or more terms, or tokens, that the matches comprise, and column name expansion program 150 may extract the partial expansions from the list of matches based on the IRS determined above. More specifically, column name expansion program 150 may select the possible matches having a highest IRS and remove any tokens within the term that do not cover (i.e., sufficiently match) a column token. In other words, the partial expansion is the matching term that is left after removing any tokens that do not cover a column name token. Based on said analysis, column name expansion program 150 may extract partial expansions (PE) from the list of possible matches (LM).

TABLE 2

| Column | Term | IRS | Partial Expansion (PE) |
|---|---|---|---|
| usr_act_id | User Account Name/Date | 2/3 | User Account |
| | Account Identifier | 2/3 | Account Identifier |
| | Action Issued Updated Date | 2/3 | Action Issued |
| | Ideology Origin | 1/3 | Ideology |

In the example introduced earlier, column name expansion program 150 extracts the partial expansions illustrated by Table 2 based on having a highest IRS and dropping anything non-matching.

Column name expansion program 150 may combine partial expansions to cover the column name (step 206). In embodiments, column name expansion program 150 may identify a group of one or more of the partial expansions that cover the tokens of the column name using a minimum number of partial expansions. Here, column name expansion program 150 may analyse the partial expansions with respect to the column name using the set cover problem and employ a greedy algorithm to solve it. The set cover problem provides an analysis that identifies a group of one or more subsets that cover an entire set with specific cover using a minimum number of the subsets. Applied here, column name expansion program 150 identifies a group of the one or more partial expansions (subsets) that cover all terms, or tokens, of the column name (set) using the fewest number of partial expansions. Column name expansion program 150 may then rank and return a top percentage of the combined partial expansions using the fewest number of partial expansions.

Returning to the previously-introduced example, column name expansion program 150 returns the combined partial expansions that cover the column name using the fewest partial expansions as illustrated by Table 3:

TABLE 3

| Combined Partial Expansions | | | | |
|---|---|---|---|---|
| Column_name | | usr | act | id |
| PE | 1 | user | | |
| | 2 | | account | |
| | 3 | | account | identifier |
| | 4 | | action | issued |
| | | | | ideology |
| Combined PE | 1, 2 | user | account | identifier |
| | 1, 3 | user | account | issued |
| | 1, 3 | user | action | issued |

TABLE 3-continued

| Combined Partial Expansions | | | |
|---|---|---|---|
| Column_name | usr | act | id |
| 1, 3, 2 | user | action | identifier |
| 1, 4 | user | account | ideology |
| 1, 3, 4 | user | action | ideology |

Column name expansion program 150 may now proceed to the process of scoring the combined partial expansions. Column name expansion program 150 may score the combined partial expansions based on one or more of the following criteria: (1) has highest matching score; (2) has minimal number of conflicts between used partial expansion; and (3) uses the minimal number of partial expansions (fragmentation).

Column name expansion program 150 may score the combined partial expansions based on matching the column name (step 208). Similar to the manner in which it is performed above, column name expansion program 150 may determine a matching score using approximate string matching, e.g., fuzzy matching. Here, the scoring takes into account TRS and the quality of every token expansion according to pre-defined rules. For example, expanding 'cnt' to 'count' may get different score than expanding 'cnt' to 'country'.

Column name expansion program 150 may score the combined partial expansions based on number of conflicts (step 210). Given two (or more) combined partial expansions PE1 and PE2, column name expansion program 150 may determine one of three possible relations between them: (a) PE1 supports PE2 if there is an intersection between the column tokens they expand and they expand the same column tokens (one or more) to the same words; (b) PE1 conflicts with PE2 if there is an intersection between the column tokens they expand but at least one column token is expanded differently; and (c) PE1 is neutral to PE2 if there is no intersection between the column tokens they expand. Given expansion created from two or more partial expansions, column name expansion program 150 calculates its conflict score as the following: (a) for each column token, its conflict score is the number of partial expansions supporting the column token expansion minus number of conflicts; and (b) the expansion conflict score is sum of scores of all column token. This score contributes to the final expansion score calculation.

Referring now back to the example above, for instance, column name expansion program 150 identifies the following PEs that either support, conflict, or are neutral to one another:

TABLE 4

| Conflict Scoring | | | | | | |
|---|---|---|---|---|---|---|
| column_name | | usr | act | id | | |
| PE | 1 | user | | | | |
| | 2 | | account | | | |
| | 3 | | action | issued | | |
| | 4 | | | ideology | | |
| | | | | | Description | Score |
| Combined PE | 1, 2 | user (1) | account (2) | identifier (1) | Support | 4 |
| | 1, 3 | user (1) | account (0) | issued (1) | Conflict (account~action) | 2 |

TABLE 4-continued

Conflict Scoring

| | | | | | |
|---|---|---|---|---|---|
| 1, 3 | user (1) | action (0) | issued (1) | Conflict (account~action) | 2 |
| 1, 3, 2 | user (1) | action (−1) | identifier (0) | Conflict (account~action twice, identifier~issued) | 0 |
| 1, 4 | user (1) | account (1) | ideology (1) | Neutral | 3 |
| 1, 3, 4 | User (1) | Action (0) | Ideology (0) | Conflict (account~action, issued~ideology) | 1 |

In Table 4, column name expansion program 150 assigns combined PE1 and PE2 (row 1 of Combined PE) a conflict score of 4 because, between PE1 and PE2 exclusively: user is supported by PE1 (+1), account is supported by both PE1 and PE2 (+2), and identifier is supported by PE2 (+1), totalling (+4) points. In addition, column name expansion program 150 assigns combined PE1 and PE3 (row 2 of Combined PE) a conflict score of 2 because, between PE1 and PE3 exclusively: user is supported by PE1 (+1), account is supported by PE (+1) but conflicts with action of PE3 (−1) (netting 0), and issued is supported by PE3 (+1), totally 2. Jumping now to combined PE1 and PE4 (row 5 of Combined PE), column name expansion program 150 assigns a score of 3 because, between PE1 and PE4 exclusively: user is supported by PE1 (+1), account is supported by PE1 (+1), and ideology is supported by PE4 (+1), totalling 3.

Column name expansion program 150 may score the combined partial expansions based on fragmentation (step 212). Fragmentation refers to the number of different partial expansions used to create the combined expansion. Here, the lower the number of partial expansions involved, the higher the score.

Column name expansion program 150 may compute a final score (step 214). In embodiments, column name expansion program 150 may compute the final score based on any or a combination of the matching score, the conflict score, and the fragmentation score. Column name expansion program 150 may employ, for example, averaging of the scores, weighted averaging, etc.

In the example introduced previously, column name expansions program 150 selects the column name usr_act_id to user account identifier based on having a best final score.

Column name expansion program 150 may optimize and store the expanded terms (step 216). To improve the results, column name expansion program 150 may consider a name of the table, for example when a column name or part thereof is an abbreviation of the table/database name or part thereof. In such a case, column name expansion program 150 may add a bonus to the final score under the presumption that a column name should correlate with the name of the table in which is it found. For example, the final score for combined candidate PE account identifier receives a bonus if it is part of a table named account data. Column name expansion program 150 may also consider other column names within the table or database and add a bonus when a candidate PE matches another column name. For example, for the column st_nm, column name expansion program 150 provides a bonus for expansion of st to street if there is another column addr_street. In addition, if there is a need to return top-n best expansions where n>1, column name expansion program 150 may require the maximal diversity between the results, where diversity refers to having a variety in the suggested expansions. To ensure a diverse set of suggestions, column name expansion program 150 assesses the similarity between potential expansions based on their basic forms, derived through lemmatization and stemming processes. Two words are considered similar if their basic forms, obtained by these linguistic methods, are the same. For instance, if the column name is vld_dt, expansions such as valid_date, validity_date, and validation_date have the same basic form (valid), and hence, are treated as similar. In striving for high diversity, column name expansion program 150 aims to minimize this similarity among the top results. This approach ensures that each suggested expansion offers a distinct interpretation of the abbreviation, rather than variations of the same concept.

In concluding the example recited herein, column name expansion program 150 stores the expanded column name user account identifier in association with the abbreviated column name usr_act_id.

The invention claimed is:

1. A computer-implemented method for expanding database column names, the method comprising:
   identifying glossary terms that sufficiently syntactically match a column name based on dividing a number of matching tokens between at least one glossary term of the glossary terms and the column name by a number of tokens within the column name;
   extracting partial expansions from the at least one glossary term;
   selectively combining one or more of the partial expansions into a set of the partial expansions; and
   storing the combined set of partial expansions in association with the column name.

2. The computer-implemented method of claim 1, wherein the selectively combining the set of partial expansions further comprises:
   scoring candidate combined sets of the partial expansions based on a matching score, a fragmentation score, and a conflict score; and
   selectively combining at least one of the candidate combined sets of partial expansions having a best scoring.

3. The computer-implemented method of claim 2, wherein the matching score is based on an approximate string match between the column name and the candidate combined sets of the partial expansions.

4. The computer-implemented method of claim 2, wherein the fragmentation score is a count of the partial expansions used to create each set of the candidate combined sets of the partial expansions.

5. The computer-implemented method of claim 2, wherein the conflict score is a measure of conflicting expansions within each of the candidate combined sets of the partial expansions.

6. The computer-implemented method of claim 2, wherein the scoring the candidate combined sets of the partial expansions is further based on at least one of:

the candidate combined sets of the partial expansions sufficiently matching at least one of a name of a corresponding table and another column name within the table; and the candidate combined sets of the partial expansions having a maximum diversity.

7. The computer-implemented method of claim 1, wherein the identifying the glossary terms that sufficiently syntactically match the column name is based on an input relation score.

8. A computer program product for expanding database column names, the computer program product comprising:
one or more non-transitory computer-readable storage media and program instructions stored on the one or more non-transitory computer-readable storage media capable of performing a method, the method comprising:
identifying glossary terms that sufficiently syntactically match a column name based on dividing a number of matching tokens between at least one glossary term of the glossary terms and the column name by a number of tokens within the column name;
extracting partial expansions from the at least one glossary term;
selectively combining one or more of the partial expansions into a set of the partial expansions; and
storing the combined set of partial expansions in association with the column name.

9. The computer program product of claim 8, wherein the selectively combining the set of partial expansions further comprises:
scoring candidate combined sets of the partial expansions based on a matching score, a fragmentation score, and a conflict score; and
selectively combining at least one of the candidate combined sets of partial expansions having a best scoring.

10. The computer program product of claim 9, wherein the matching score is based on an approximate string match between the column name and the candidate combined sets of the partial expansions.

11. The computer program product of claim 9, wherein the fragmentation score is a count of the partial expansions used to create each set of the candidate combined sets of the partial expansions.

12. The computer program product of claim 9, wherein the conflict score is a measure of conflicting expansions within each of the candidate combined sets of the partial expansions.

13. The computer program product of claim 9, wherein the scoring the candidate combined sets of the partial expansions is further based on at least one of:
the candidate combined sets of the partial expansions sufficiently matching at least one of a name of a corresponding table and another column name within the table; and the candidate combined sets of the partial expansions having a maximum diversity.

14. The computer program product of claim 8, wherein the identifying the glossary terms that sufficiently syntactically match the column name is based on an input relation score.

15. A computer system for expanding database column names, the system comprising:
one or more computer processors, one or more computer-readable storage media, and program instructions stored on the one or more of the computer-readable storage media for execution by at least one of the one or more processors capable of performing a method, the method comprising:
identifying glossary terms that sufficiently syntactically match a column name based on dividing a number of matching tokens between at least one glossary term of the glossary terms and the column name by a number of tokens within the column name;
extracting partial expansions from the at least one glossary term;
selectively combining one or more of the partial expansions into a set of the partial expansions; and
storing the combined set of partial expansions in association with the column name.

16. The computer system of claim 15, wherein the selectively combining the set of partial expansions further comprises:
scoring candidate combined sets of the partial expansions based on a matching score, a fragmentation score, and a conflict score; and
selectively combining at least one of the candidate combined sets of partial expansions having a best scoring.

17. The computer system of claim 16, wherein the matching score is based on an approximate string match between the column name and the candidate combined sets of the partial expansions.

18. The computer system of claim 16, wherein the fragmentation score is a count of the partial expansions used to create each set of the candidate combined sets of the partial expansions.

19. The computer system of claim 16, wherein the conflict score is a measure of conflicting expansions within each of the candidate combined sets of the partial expansions.

20. The computer system of claim 16, wherein the scoring the candidate combined sets of the partial expansions is further based on at least one of:
the candidate combined sets of the partial expansions sufficiently matching at least one of a name of a corresponding table and another column name within the table; and
the candidate combined sets of the partial expansions having a maximum diversity.

* * * * *